US012124281B2

(12) United States Patent
Maruyama et al.

(10) Patent No.: US 12,124,281 B2
(45) Date of Patent: Oct. 22, 2024

(54) AUTONOMOUS WORKING MACHINE (71) Applicant: HONDA MOTOR CO., LTD., Tokyo (JP)

(72) Inventors: Shuhei Maruyama, Wako (JP); Kenta Kawanishi, Wako (JP); Haruna Minawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 290 days.

(21) Appl. No.: 17/690,749

(22) Filed: Mar. 9, 2022

(65) Prior Publication Data
US 2022/0300007 A1 Sep. 22, 2022

(30) Foreign Application Priority Data
Mar. 16, 2021 (JP) .................................. 2021-042527

(51) Int. Cl.
*G05D 1/244* (2024.01)
*G05D 1/00* (2006.01)
*G05F 5/00* (2006.01)
*A01D 34/00* (2006.01)

(52) U.S. Cl.
CPC ........... *G05D 1/244* (2024.01); *G05D 1/0259* (2013.01); *G05F 5/00* (2013.01); *A01D 34/008* (2013.01)

(58) Field of Classification Search
CPC combination set(s) only.
See application file for complete search history.

(56) References Cited

U.S. PATENT DOCUMENTS

| | | | |
|---|---|---|---|
| 6,300,737 B1 * | 10/2001 | Bergvall | A01D 34/008 318/587 |
| 11,464,161 B1 * | 10/2022 | Phanco | A01D 75/185 |
| 2013/0018527 A1 * | 1/2013 | Bernini | G05D 1/0265 701/2 |
| 2014/0012418 A1 * | 1/2014 | Johnson | A01D 34/008 700/258 |
| 2015/0366130 A1 * | 12/2015 | Bergström | B60L 50/52 901/1 |
| 2016/0113195 A1 * | 4/2016 | Das | G05D 1/0261 701/25 |
| 2017/0322562 A1 * | 11/2017 | Churavy | G01S 5/0205 |

(Continued)

FOREIGN PATENT DOCUMENTS

JP 2017-010161 1/2017

*Primary Examiner* — Jason Holloway
*Assistant Examiner* — Benjamin J Brosh
(74) *Attorney, Agent, or Firm* — Rankin, Hill & Clark LLP (57) ABSTRACT

The autonomous working machine including: a magnetic field detection part for detecting a magnetic field generated by the energization to the area wire; a storage part for storing a reference value of the magnetic field detection by the magnetic field detection part; a control part for controlling a traveling route based on the reference value stored in the storage part and the magnetic field detected by the magnetic field detection means; and an input part for receiving a selection of a first reference value used in a case where the area wire is installed at a first distance from the ground or a second reference value used in a case where the area wire is installed at a second distance from the ground, wherein the control part controls a traveling route based on the first reference value or the second reference value selected by the input part.

6 Claims, 6 Drawing Sheets

(56) References Cited

U.S. PATENT DOCUMENTS

2019/0064842 A1* 2/2019 Dalfra .................. G05D 1/0265
2020/0137953 A1* 5/2020 Alzen .................. G05D 1/0265
2020/0371529 A1* 11/2020 Alzen .................. G05D 1/0265

* cited by examiner

AUTONOMOUS WORKING MACHINE

INCORPORATION BY REFERENCE

The present application claims priority under 35 U.S.C. § 119 to Japanese Patent Application No. 2021-042527 filed on Mar. 16, 2021. The content of the applications is incorporated herein by reference in its entirety.

BACKGROUND OF THE INVENTION

Field of the Invention

The present invention relates to an autonomous working machine for performing a work while autonomously traveling in a prescribed work area.

Description of the Related Art

An autonomous traveling working machine for performing a work while autonomously traveling is known in the conventional art.

For example, Japanese Patent Laid-Open No. 2017-010161 discloses a battery-driven lawn mower for performing a mowing work while autonomously traveling on a lawn ground, as an example of an autonomously traveling working machine.

The use of a lawn mower described in Japanese Patent Laid-Open No. 2017-010161 makes it possible to perform an unattended mowing work.

In such case, an area wire defining the work area is buried into the ground.

However, laying an area wire requires man-hours and is time-consuming.

Therefore, one possible measure is to install an area wire in the air.

However, if an area wire is installed in the air, the distance between an area wire and a magnetic field detection part detecting the magnetic field of an area wire, becomes larger. As such, there is a problem in that the magnetic field in the area wire installed in the air cannot be detected in the same way as the area wire installed in the ground.

In addition, there is a possibility that an autonomous working machine contacts an area wire, if an area wire is in the air.

The present invention has been made in view of the foregoing circumstances, and the present invention has an object to provide an autonomous working machine capable of detecting an area wire properly and performing a work in the work area appropriately after the proper detection of the area wire, in both cases of the area wire installed in the ground and above the ground.

SUMMARY OF THE INVENTION

An aspect of the present invention is an autonomous working machine for performing a work within an area defined by an area wire, the autonomous working machine including: magnetic field detection means for detecting a magnetic field generated by the energization to the area wire; a storage part for storing a reference value of the magnetic field detection by the magnetic field detection means; a control part for controlling a traveling route based on the reference value stored in the storage part and the magnetic field detected by the magnetic field detection means; and an input part for receiving a selection of a first reference value or a second reference value, the first reference value being used in a case where the area wire is installed at a first distance from the ground, the second reference value being used in a case where the area wire is installed at a second distance from the ground, wherein the control part controls a traveling route based on the first reference value or the second reference value selected by the input part.

In the foregoing configuration, the first reference value is a reference value when the area wire is in the ground, wherein the second reference value is a reference value when the area wire is above the ground.

In the foregoing configuration, a distance between the area wire and the magnetic field detection means is input via the input part, and the control part sets the first reference value or the second reference value based on the input distance between the area wire and the magnetic field detection means.

In the foregoing configuration, the distance between the area wire and the magnetic field detection means is numerically input via the input part.

In the foregoing configuration, the input part via which the distance between the area wire and the magnetic field detection means is input includes an input part for increasing a set distance and an input part for decreasing a set distance, and the autonomous working machine further includes a display part for displaying the input distance between the area wire and the magnetic field detection means.

In the foregoing configuration, whether the area wire is in the ground or above the ground is input via the input part, and the control part sets the first reference value or the second reference value based on a position of the area wire, the position being input via the input part.

In the foregoing configuration, the area wire above the ground is supported by wire supporting members installed on the ground.

In the foregoing configuration, the control part uses the first reference value and the second reference value as criteria in determining a distance between the area wire and the magnetic field detection means.

In the foregoing configuration, the control part sets a traveling route near the area wire to be shifted.

In the foregoing configuration, when the area wire is above the ground, the control part sets a traveling route such that an autonomous working machine makes a turn at a position having a larger distance from the area wire, as compared with the area wire in the ground.

According to the aspect of the present invention, it is possible for a control part to determine a work area corresponding to the installation state of an area wire, enabling a work within the work area easily and appropriately.

DETAILED DESCRIPTION OF THE PREFERRED EMBODIMENTS

Hereinafter, an embodiment of the present invention is described with reference to the accompanying drawings.

Figure 1:
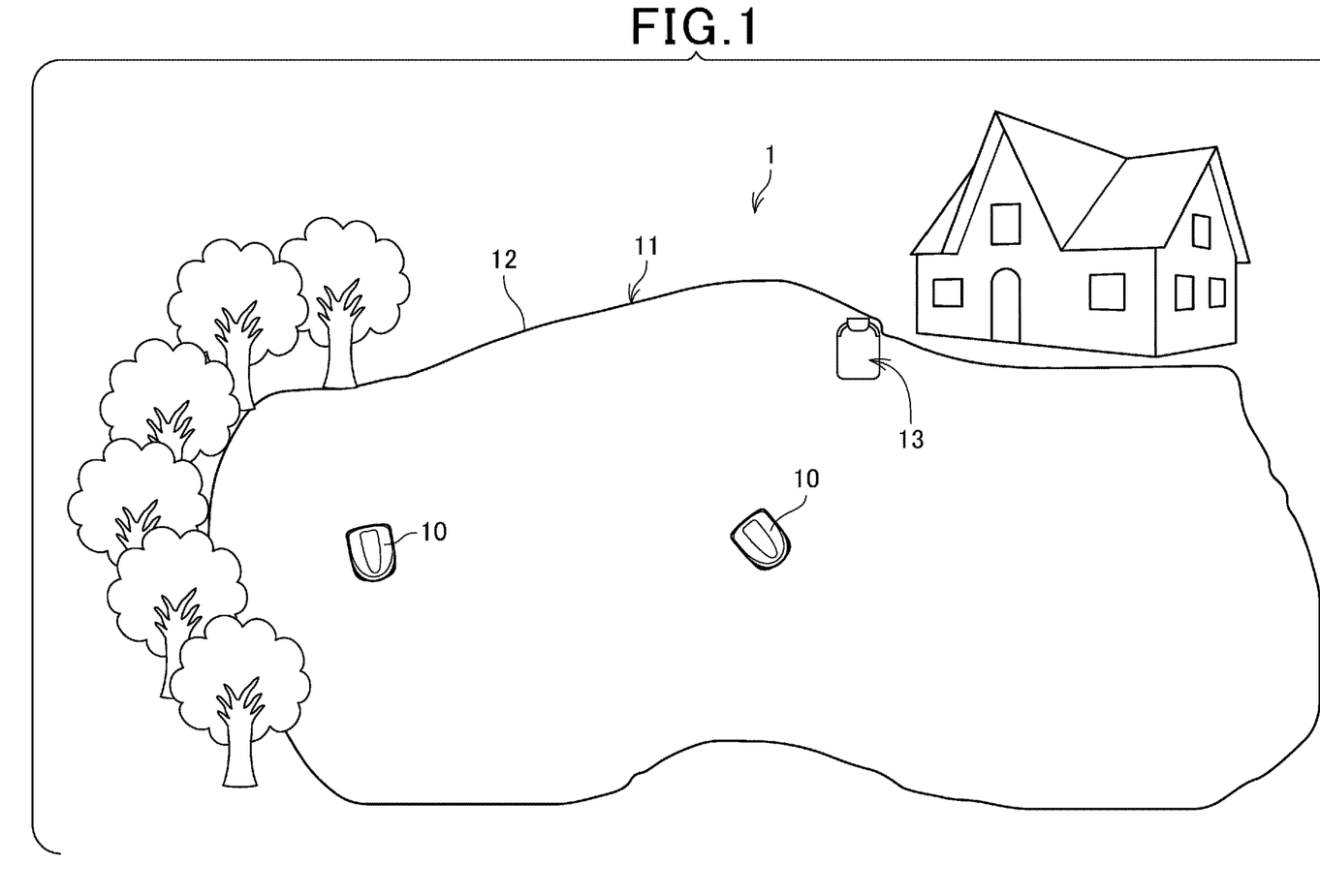
FIG. 1 shows a configuration of a lawn mowing system in an embodiment.

FIG. 1 shows a configuration of a lawn mowing system according to the embodiment.

The embodiment describes an example of a lawn mowing system 1, in a case of using an autonomous lawn mower for performing a mowing work automatically in a prescribed area by traveling autonomously as an autonomous working machine.

The lawn mowing system 1 includes autonomous lawn mowers 10 as autonomous working machines, an area wire 12 defining a work area 11 on which a mowing work is performed, and a station 13.

The autonomous lawn mowers 10 are autonomous traveling working machines for mowing lawn while autonomously traveling in the work area 11 in an unattended state.

The area wire 12 is magnetized, and the autonomous lawn mower 10 detects the boundary of the work area 11 by detecting the magnetism of the area wire 12.

Alternatively, the lawn mowing system 1 may have a plurality of (for example, two) autonomous lawn mowers 10.

The station 13 is installed in the work area 11 and performs charging or the like for the autonomous lawn mowers 10.

The area wire 12 is laid out at the outer edge of a prescribed work area 11. The area wire 12 may be installed in the ground or may be installed floating in the air with the wire supported by wire supporting members 14 provided at the prescribed intervals.

Then, the area defined by the area wire 12 is set as the work area 11. In this case, as the work area 11, if a branching wire branched from the station 13 (not shown) is installed, the area surrounded by the branching wire may also be included in the work area, in addition to the area surrounded by the area wire 12.

Figure 2:
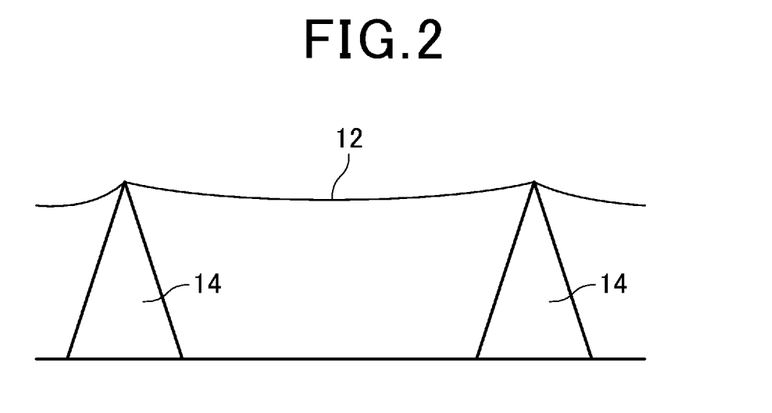
FIG. 2 shows a schematic view illustrating an example of installing an area wire above the ground in the embodiment.

FIG. 2 shows a schematic view illustrating an example of installing the area wire 12 above the ground. As shown in FIG. 2, the wire supporting members 14 like a so-called color cone (registered trademark) are installed in the boundary section of the work area 11. The area wire 12 is then supported on the upper part of the wire supporting members 14.

Note that, for the wire supporting members 14, a column buried in the ground may be used in the wire supporting members 14.

Figure 3:
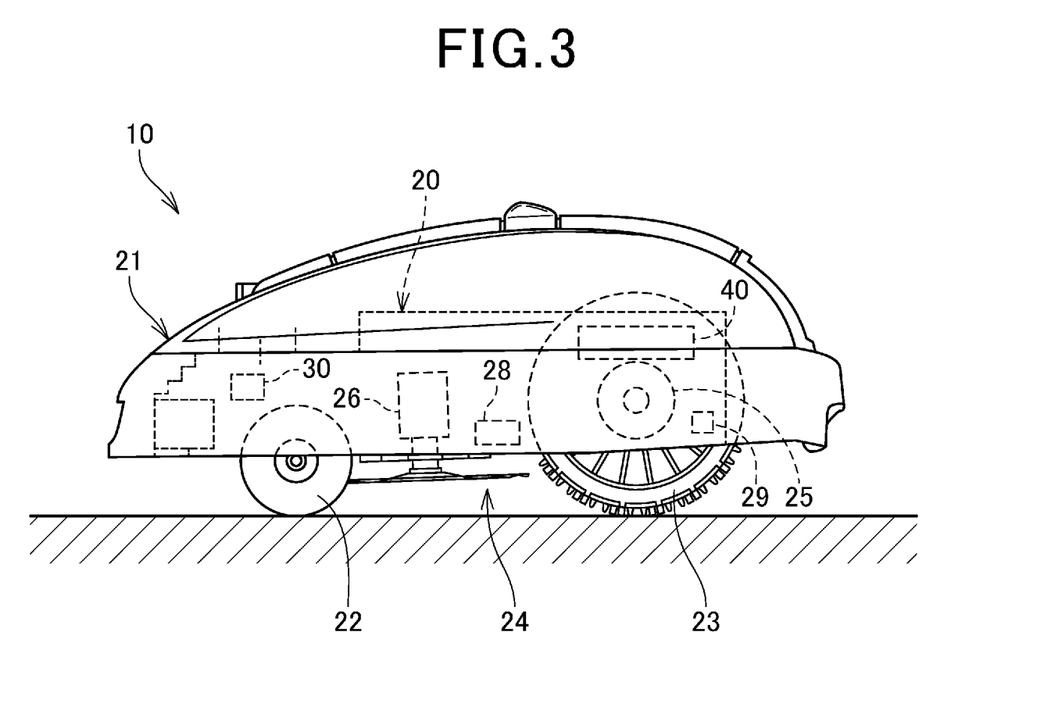
FIG. 3 is a side view showing a configuration of an autonomous lawn mower in the embodiment.

FIG. 3 is a side view showing an example of the configuration of the autonomous lawn mower 10 according to the embodiment.

As shown in FIG. 3, the autonomous lawn mower 10 includes a main body 20 having a traveling function or the like, and a body cover 21 covering the main body 20. Right and left front wheels 22 are steerably provided on the right and the left sides at the front lower part of the main body 20. Furthermore, right and left rear wheels 23 functioning as drive wheels are provided on the rear lower part of the main body 20. A working part 24 is provided at the central lower part of the main body 20.

The main body 20 includes right and left traveling motors 25 for individually driving the right and left rear wheels 23. The traveling motors 25 individually drive the right and left rear wheels 23, then the autonomous lawn mower 10 is driven to run.

The working part 24 includes a motor driving a working part 26 and a cutting blade disc 27 with a cutting blade provided on a disk-shaped disc. Then, the motor driving a working part 26 rotationally drives the cutting blade disc 27 to cut grass.

The main body 20 includes a battery 28 functioning as a power for supplying an operating power to each part of the autonomous lawn mower 10, a wheel speed sensor 29 detecting the rotation speed of the right and left rear wheels 23 as driving wheels, a magnetic field detection part (sensor) 30 as magnetic field detection means for detecting the magnetic field of the area wire 12, and a control unit 40 for controlling each part of the autonomous lawn mower 10.

Next, a control configuration of an autonomous traveling lawn mower is described.

Figure 4:
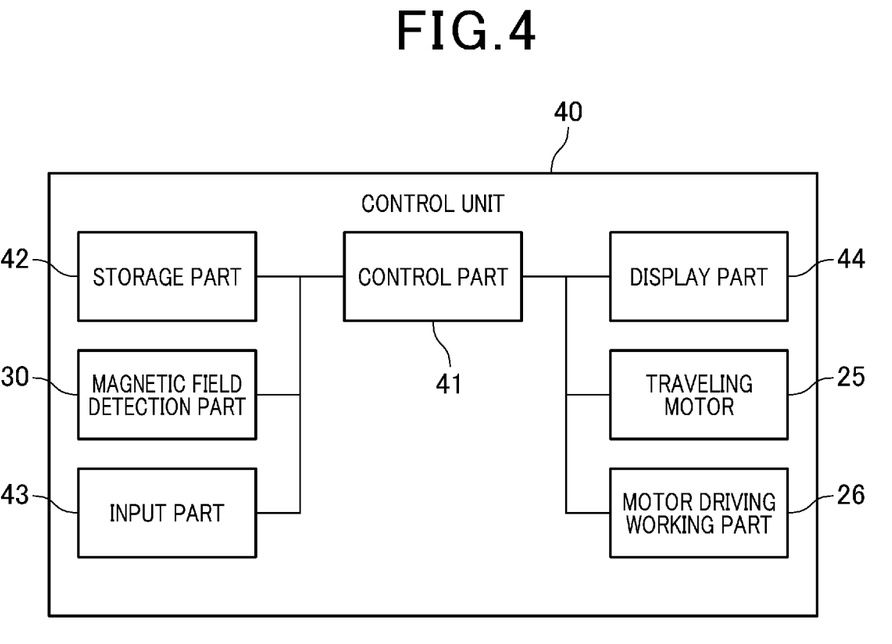
FIG. 4 is a block diagram showing a control configuration of an autonomous traveling lawn mower in the embodiment.

FIG. 4 is a block diagram showing a control configuration of the autonomous traveling lawn mower in the embodiment.

As shown in FIG. 4, the control unit 40 includes a control part 41 for controlling the operation of each part of the autonomous lawn mower 10. For example, the control part 41 includes a processor of Central Processing Unit (CPU) or the like and a storage part 42 (memory) of Random Access Memory (RAM), Read Only Memory (ROM) or the like.

The storage part 42 stores data such as the map data on an area being the target of a work, the schedule data related to a mowing work, and the data of a control program. Specifically, the processor of the control part 41 executes a control program to control the operation of each part of the autonomous lawn mower 10.

The control part 41 receives a detection signal from the magnetic field detection part 30 detecting the magnetic field of the area wire 12.

Further, the control unit 40 is provided with an input part 43 for inputting the predetermined information by the user and a display part 44 for displaying the predetermined information.

The storage part 42 stores a first reference value and a second reference value in addition to the previously mentioned data. A first reference value is a reference value when the area wire 12 is installed in the ground, whereas a second reference value is a reference value when the area wire 12 is installed above the ground. The first reference value and the second reference value are both the values of the magnetic field strength.

Figure 5:
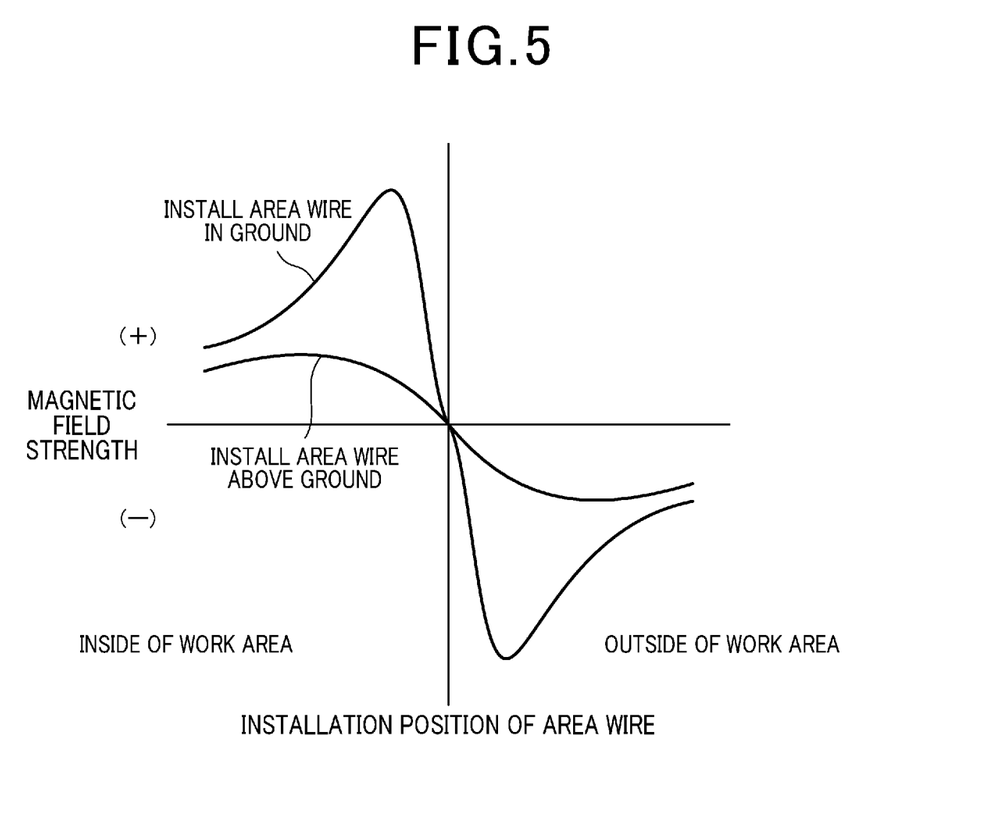
FIG. 5 is a graph showing a relation between an installation position of an area wire and a magnetic field strength.

FIG. 5 is a graph showing a relation between the installation position of the area wire 12 and the magnetic field strength.

As shown in FIG. 5, regarding the magnetic field from the area wire 12, the magnetic field can be detected on the positive side at the inside of the work area, while the magnetic field can be detected on the negative side at the outside of the work area, with respect to the position where the area wire 12 is installed.

Concerning the magnetic field where the area wire 12 is installed in the ground, the large magnetic field values can be detected on both the positive side and the negative side. On the other hand, in the case of the area wire 12 installed above the ground, the values of the magnetic field on the positive side and the negative side are smaller than the values of the magnetic field when the area wire is installed in the ground.

In the embodiment, the first reference value of the magnetic field from the area wire 12 installed in the ground in advance and the second reference value of the magnetic field from the area wire 12 installed above the ground are stored in the storage part 42 beforehand.

The user inputs, via the input part 43, whether to have the lawn mowing area determined based on the first reference value when the area wire 12 is installed in the ground or based on the second reference value when the area wire 12 is installed above the ground.

When the first reference value is selected, the control part 41 detects the area wire 12 and controls the traveling route by determining the magnetic field strength based on the first reference value. In addition, when the second reference value is selected, the control part 41 detects the area wire 12 and controls the traveling route by determining the magnetic field strength based on the second reference value.

Figure 6:
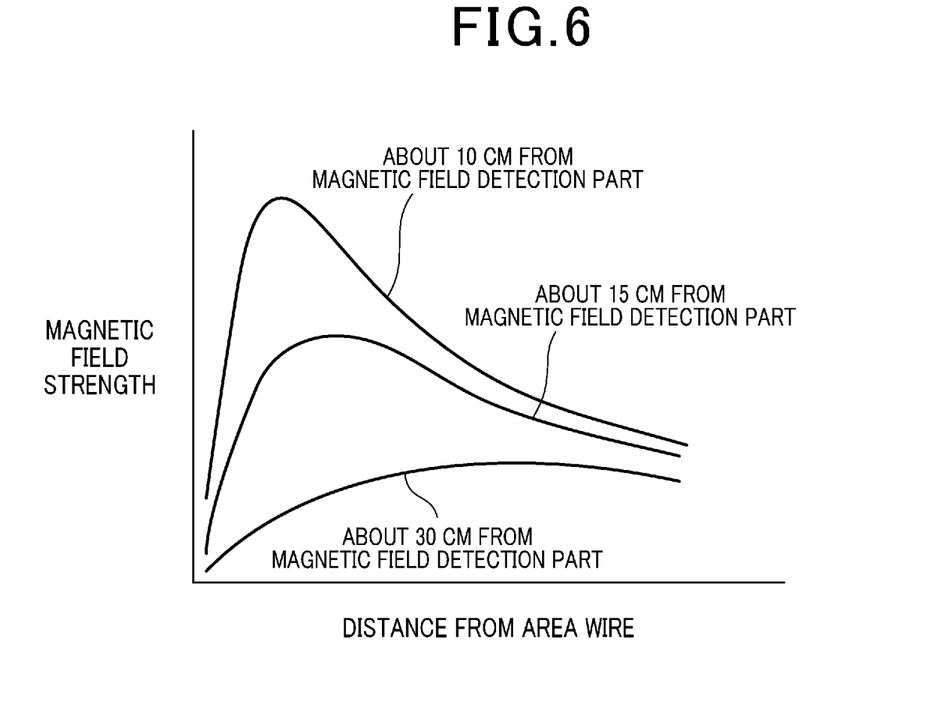
FIG. 6 is a graph showing a relation between a distance from an area wire and a magnetic field strength.

FIG. 6 is a graph showing a relation between the distance from the area wire 12 and the magnetic field strength.

As shown in FIG. 6, the magnetic field strength also varies with the distance between the magnetic field detection part 30 and the area wire 12. In other words, when the distance between the magnetic field detection part 30 and the area wire 12 is small, the magnetic field strength is increased. However, when the distance between the magnetic field detection part 30 and the area wire 12 is large, the magnetic field strength is reduced.

Thus, the use may input, via the input part 43, the distance between the magnetic field detection part 30 and the area wire 12, if the first reference value or the second reference value is selected.

When the area wire 12 is installed in the ground, the distance between the area wire 12 and the magnetic field detection part 30 is short, whereas when the area wire 12 is installed above the ground, the distance between the area wire 12 and the magnetic field detection part 30 is long.

Therefore, when the distance between the area wire 12 and the magnetic field detection part 30 is small, the first reference value is used, however when the distance between the area wire 12 and the magnetic field detection part 30 is large, the second reference value is used.

In this case, a (+) key of an input part for increasing a set distance and a (−) key of an input part for decreasing a set distance, may be provided on the operation part, so that the distance between the magnetic field detection part 30 and the area wire 12 may be input by the user operating the (+) key and the (−) key.

Alternatively, a numeric keypad may be provided on the operation part, so that the distance between the magnetic field detection part 30 and the area wire 12 may be directly input as a number.

The control unit 40 may be provided with the display part 44 such that the display part 44 may display the input distance between the magnetic field detection part 30 and the area wire 12.

Further, whether the area wire 12 is in the ground or above the ground may be directly selected by the input part 43.

As mentioned above, when the first reference value is selected, the control part 41 detects the area wire 12 and controls the traveling route by determining the magnetic field strength based on the first reference value. In addition, when the second reference value is selected, the control part 41 detects the area wire 12 and controls the traveling route by determining the magnetic field strength based on the second reference value.

In such case, when the area wire 12 is installed in the ground, an autonomous working machine can travel on the ground where the area wire 12 is installed. Thus, it is possible to set a traveling route using an overlap traveling in which an autonomous working machine travels through the place where the area wire 12 is installed.

Specifically, an autonomous working machine is set to make a turn when the switching from a positive to a negative of a magnetic field is detected by the magnetic field detection part 30, so that the autonomous lawn mower 10 is set to pass over the installation position of the area wire 12.

In contrast, when the second reference value is selected, since the area wire 12 is installed above the ground, an autonomous working machine approaching the wire supporting member 14 for supporting the area wire 12 may lead to the contact between the autonomous lawn mower 10 and the wire supporting member 14. For that reason, when the second reference value is selected, to prevent an overlap traveling, a traveling route is set by the control part 41 such that an autonomous working machine makes a turn with a predetermined distance secured for a place where the area wire 12 is installed.

Moreover, it is preferable that the control part 41 sets a traveling route near the area wire 12 to be shifted. In a place near the area wire 12, the traveling and the turn of an autonomous working machine are repeatedly performed. Thus, shifting the traveling route leads to the suppression of forming a rut on the lawn mowing area.

As described above, in the embodiment, the control part 41 sets the traveling route of an autonomous working machine based on the reference value input by the user.

If the first reference value is selected, the control part 41 controls an autonomous working machine to perform an overlap traveling when the autonomous working machine approaches the area wire 12.

On the contrary, if the second reference value is selected, the control part 41 controls in such a way that an autonomous working machine makes a turn with a predetermined distance secured for the area wire 12, so as not to allow the autonomous working machine to perform an overlap traveling when the autonomous working machine approaches the area wire 12.

By controlling this way, an autonomous working machine can be controlled appropriately in both cases of the area wire 12 installed in the ground and above the ground.

Installing the area wire 12 into the ground is extremely time-consuming, and the work area 11 is fixed.

Installing the area wire 12 above the ground using the wire supporting members 14 allows for defining the work area 11 easily, making it possible to set a temporary work area 11.

In the embodiment, since an autonomous working machine can operate in both cases of the area wire 12 in the ground and above the ground, a work can be easily and appropriately performed.

As described above, the embodiment includes: the magnetic field detection part 30 (magnetic field detection means) for detecting a magnetic field generated by the energization to the area wire 12; the storage part 42 for storing the reference value of the magnetic field detection by the magnetic field detection part 30; the control part 41 for controlling a traveling route based on the reference value stored in the storage part 42 and the magnetic field detected by the magnetic field detection means; and the input part 43 for receiving a selection of a first reference value used in a case where the area wire 12 is installed at a first distance from the ground or a second reference value used in a case where the area wire 12 is installed at a second distance from the ground, wherein the control part 41 controls a traveling route based on the first reference value or the second reference value selected by the input part 43.

This enables the control part 41 to determine the work area 11 corresponding to the installation state of the area wire 12, thereby performing the work within the work area 11 easily and appropriately.

Further, in the embodiment, the first reference value is a reference value when the area wire 12 is in the ground, while the second reference value is a reference value when the area wire 12 is above the ground.

As a result, by using the first reference value and the second reference value, an autonomous working machine can operate in both cases of the area wire 12 in the ground and above the ground, thereby performing a work easily and appropriately.

Furthermore, in the embodiment, the distance between the area wire 12 and the magnetic field detection part 30 (magnetic field detection means) is input via the input part 43. Then, the control part 41 sets the first reference value or the second reference value based on the input distance between the area wire 12 and the magnetic field detection part 30.

Thus, by inputting the distance between the area wire 12 and the magnetic field detection part 30 from the input part 43, it is possible to set the first reference value and the second reference value.

In addition, in the embodiment, the area wire 12 installed above the ground is supported by the wire supporting members 14 installed on the ground.

This makes the installation of the area wire 12 above the ground with ease.

Additionally, in the embodiment, the control part 41 uses the first reference value and the second reference value as criteria in determining the distance between the area wire 12 and the magnetic field detection part 30 (magnetic field detection means).

Thus, using the magnetic field strength from the first reference value and the second reference value enables the determination of the distance between the area wire 12 and the magnetic field detection part 30. Therefore, the control part 41 can set the traveling route of the autonomous lawn mower 10 while determining the distance from the area wire 12.

Further, in the embodiment, the control part 41 sets the traveling route near the area wire 12 to be shifted.

As a result, shifting the traveling route near the area wire 12 leads to the suppression of forming a rut on the lawn mowing area.

In addition, in the embodiment, if the area wire 12 is above the ground, the control part 41 sets a traveling route such that an autonomous working machine makes a turn at a position having a larger distance from the area wire 12, as compared with the area wire 12 in the ground.

Thus, when the autonomous lawn mower 10 approaches the area wire 12, it is possible to set the traveling route so as not to allow the autonomous lawn mower 10 to perform an overlap traveling, thereby avoiding hitting the autonomous lawn mower 10 and the wire supporting member 14 with each other.

The present invention is not limited to the configuration of the above embodiment and can be implemented in various embodiments without departing from the gist.

For example, in the embodiment, although the case when an autonomous working machine is an autonomous lawn mower 10 has been described, the present invention is not limited to this. For example, the present invention is also applicable to a work other than lawn mowing, such as a work of mowing grass or a cleaning work.

REFERENCE SIGNS LIST 1 lawn mowing system
10 autonomous lawn mower
11 work area
12 area wire
13 station
14 wire supporting member
24 working part
25 traveling motor
26 motor driving a working part
27 cutting blade disc
28 battery
29 wheel speed sensor
30 magnetic field detection part
40 control unit
41 control part
42 storage part
43 input part
44 display part

What is claimed is:

1. An autonomous working machine for performing a work within an area defined by an area wire, the autonomous working machine comprising a processor and a memory, the processor functions as:
   magnetic field detection means for detecting a magnetic field generated by an energization of the area wire;
   a storage part for storing, in the memory, a reference value of the magnetic field detection by the magnetic field detection means;
   a control part for controlling a traveling route based on the reference value stored in the memory and the magnetic field detected by the magnetic field detection means; and
   an input part for receiving a selection, by a user, as to whether to detect the magnetic field using a first reference value or a second reference value, the first reference value being used in a case where the area wire is installed in the ground, the second reference value being used in a case where the area wire is installed floating in air with the area wire supported by wire supporting members provided at prescribed intervals, wherein
   the magnetic field detection means is configured to detect magnetic fields of different poles at an inside of the area and at an outside of the area with respect to a position where the area wire is installed,
   the control part controls a traveling route based on the first reference value or the second reference value selected by the input part,
   in a case where the traveling route is controlled based on the first reference value, the traveling route is set to make a turn so as to go toward the inside of the area when a switching between the poles of the magnetic field is detected by the magnetic field detection means, and
   in a case where the traveling route is controlled based on the second reference value, the traveling route is set to make a turn inside the area from a place where the area wire is installed.

2. The autonomous working machine according to claim 1, wherein
   a distance of the area wire from the ground is input via the input part, and the control part sets the first reference value or the second reference value based on the input distance of the area wire from the ground.

3. The autonomous working machine according to claim 2, wherein the distance of the area wire from the ground is numerically input via the input part.

4. The autonomous working machine according to claim 2, wherein the input part via which the distance of the area wire from the ground is input comprises an input part for increasing a set distance and an input part for decreasing a set distance, and the autonomous working machine further comprises a display for displaying the input distance of the area wire from the ground.

5. The autonomous working machine according to claim 1, wherein the control part uses the first reference value and the second reference value as criteria in determining a distance of the area wire from the ground.

6. The autonomous working machine according to claim 1, wherein the control part sets the traveling route near the area wire to be shifted.

\* \* \* \* \*